(12) United States Patent
Sauter et al.

(10) Patent No.: US 9,568,107 B2
(45) Date of Patent: Feb. 14, 2017

(54) MECHANICAL SEAL

(71) Applicant: KACO GmbH + Co. KG, Heilbronn (DE)

(72) Inventors: Bernd Sauter, Sinsheim (DE); Tobias Hoffmann, Talheim (DE)

(73) Assignee: KACO GmbH + Co. KG, Heilbronn (DE)

( * ) Notice: Subject to any disclaimer, the term of this patent is extended or adjusted under 35 U.S.C. 154(b) by 0 days.

(21) Appl. No.: 13/721,113

(22) Filed: Dec. 20, 2012

(65) Prior Publication Data

US 2013/0161912 A1 Jun. 27, 2013

(30) Foreign Application Priority Data

Dec. 21, 2011 (DE) .................. 10 2011 122 477

(51) Int. Cl.
*F16J 15/00* (2006.01)
*F16J 15/34* (2006.01)
*F16J 15/16* (2006.01)

(52) U.S. Cl.
CPC .............. *F16J 15/348* (2013.01); *F16J 15/16* (2013.01)

(58) Field of Classification Search
CPC ............ F16J 15/32; F16J 15/56; F16J 15/348; F16J 15/16
USPC ....... 277/348, 352, 358, 370, 371, 374, 375, 277/377, 389, 390, 391, 500
See application file for complete search history.

(56) References Cited

U.S. PATENT DOCUMENTS

| 4,092,963 | A | * | 6/1978 | Vrooman | F02M 31/18 123/549 |
| 4,275,889 | A | * | 6/1981 | Butler et al. | 277/393 |
| 4,754,981 | A | * | 7/1988 | Burns | F16J 15/348 277/353 |
| 4,779,876 | A | * | 10/1988 | Novosad | F16J 15/348 277/375 |
| 5,947,479 | A | | 9/1999 | Ostrowski | |
| 2009/0140494 | A1 | * | 6/2009 | Roddis | 277/408 |
| 2011/0198813 | A1 | * | 8/2011 | Takahashi | 277/387 |

FOREIGN PATENT DOCUMENTS

CA 2791356 A1 7/2011
EP 0 227 282 A1 7/1987

* cited by examiner

*Primary Examiner* — Kristina Fulton
*Assistant Examiner* — Nathan Cumar
(74) *Attorney, Agent, or Firm* — Gudrun E. Huckett

(57) ABSTRACT

A mechanical seal has a housing having a collecting space for a coolant/lubricant medium. A sleeve is disposed in the housing. A counter ring is disposed in the housing and fixedly connected to the sleeve. A slide ring is disposed in the housing and interacts with the counter ring. At least one inlet conduit communicating with the collecting space is provided. The at least one inlet conduit is positioned between a radial bottom of the housing and a radial ring segment of the sleeve.

10 Claims, 4 Drawing Sheets

MECHANICAL SEAL

BACKGROUND OF THE INVENTION

The invention concerns a mechanical seal comprising a counter ring and a slide ring arranged in a housing in which a collecting space for a coolant/lubricant is provided into which at least one inlet conduit line opens.

Mechanical seals are used, for example, in water pumps of automobiles. The mechanical seal must be embodied in such a way that it can be operated without the liquid to be sealed for a sufficiently long period. The heat generated in the sealing gap between counter ring and slide ring should not cause thermal damage of the sliding partners themselves nor should it cause thermal damage of the sealing components surrounding the sliding partners. So that in dry run conditions a sufficiently low sealing gap temperature is reached, special coal graphite materials which are relatively soft are used for the slide ring. However, such materials are not very resistant toward abrasive attack. The counter ring is typically made of a hard material, like SiC. Such a soft/hard sliding pair has therefore a lower life span than a hard/hard sliding pair in which the counter ring and the slide ring are made, for example, from SiC. Such sliding pairs however have relatively bad dry run properties. The mechanical seal is provided therefore with a collecting space in which coolant/lubricant is stored that imparts to the mechanical seal the required dry run permanence, even when a soft/hard sliding pair is used. The inlet conduit serves to transport coolant/lubricant from the receiving space of the pump to the collecting space of the mechanical seal.

The object of the invention is to embody a mechanical seal of the aforementioned kind in such a way that the inlet conduit can be provided in an easy manner in the mechanical seal. In this connection, the inlet conduit should be provided in such a way that the coolant/lubricant contained in the collecting space resides for a longer period of time in the collecting space when the mechanical seal works in dry run conditions.

SUMMARY OF THE INVENTION

This object is solved for a mechanical seal of the aforementioned kind in accordance with the invention in that the inlet conduit is positioned between a radial bottom of the housing and a radial ring segment of a sleeve with which the counter ring is fixedly connected.

The mechanical seal according to the invention is characterized in that the inlet conduit is positioned between the radial housing bottom and the radial ring segment of the sleeve to which the counter ring is fixedly connected. The sleeve of the mechanical seal is fixedly connected with the shaft to be sealed, for example, is pressed onto it. Because the inlet conduit is limited by components of the mechanical seal, the inlet conduit can be provided in a very simple way and in accordance with respective specifications for the mechanical seal. In particular, the height of the inlet conduit can be very simply adjusted. It is thereby possible to embody the inlet conduit, for example, in a range of from 0.5 mm up to 4 mm in respect to height. The housing bottom and the ring segment of the sleeve are mutually adjusted during assembly of the mechanical seal which is possible in an easy and inexpensive manner.

When the mechanical seal is used, for example, in a water pump of an automobile, the collecting space of the mechanical seal is also filled with the coolant/lubricant via the inlet conduit upon filling of the water pump with this medium.

Advantageously, the inlet conduit extends radially. Such an inlet conduit can be realized in a very simple way.

The inlet conduit is advantageously an annular gap which is provided between the radial housing bottom and the radial ring segment of the sleeve. The collecting space of the mechanical seal can thereby be filled simply and quickly with coolant/lubrication medium.

A simply easy embodiment results when the inlet conduit extends straight across its radial length. The coolant/lubricant can then be easily guided into the collecting space.

It is also possible to embody the inlet conduit in such a way that it is comprised of segments that are axially displaced relative to each other. Such an inlet conduit can be very simply produced in that the radial housing bottom and the radial ring segment of the sleeve each have appropriately stepped and shaped segments. Filling of the collecting space is not affected by such a displaced or stepped course of the inlet conduit. On the other hand, such an embodiment of the inlet conduit provides that the coolant/lubricant contained in the collecting space is retained for a period as long as possible in the collecting space in case of dry run operation.

So that coolant/lubricant can simply reach the inlet conduit, the housing bottom is provided with a central opening through which the coolant/lubricant can flow into the collecting space. The central opening of the housing bottom is designed such that the shaft to be sealed passes through it and the opening edge surrounds this shaft at a radial distance.

The counter ring is arranged advantageously between an external cylindrical wall and the ring segment of the sleeve. The ring segment forms a boundary of the inlet conduit and passes into the external cylindrical wall.

So that the medium can be retained for a long time in the collecting space of the mechanical seal, the ratio of the radial distance of the external cylindrical wall of the sleeve from the edge of the central opening in the housing bottom to the radial distance of the edge of the central opening in the housing bottom to the internal cylindrical wall of the sleeve is in a range from about 1.5:1 to about 3:1. A large radial length of the supply conduit is achieved as a result of this distance ratio and this ensures a long residence time of the medium in the collecting space in case of dry run operation. On the one hand, the medium in the collecting space is evenly distributed by the rotary counter ring in the collecting space and, on the other hand, and is caused to rotate. On account of the distance ratio it is guaranteed in spite of the flow of the medium in the collecting space that the medium remains long enough in the collecting space and cools and lubricates the sliding partners sufficiently.

The collecting space is sealed advantageously relative to the internal cylindrical wall of the sleeve in such a way that coolant/lubricant cannot bypass the sliding partners and reach the interior.

In an advantageous embodiment the case is provided with at least one venting hole that opens into the collecting space; by means of the venting hole the flow of the medium in the collecting space is promoted.

So that this medium does not escape through the venting hole to the exterior, the venting hole is partially closed by at least one cover. With the cover, the venting hole is closed so far that venting is possible but the medium contained in the collecting space can escape only slowly to the exterior.

In an advantageous embodiment, this cover is an extended segment (extension) of a spring plate on which a compression spring that axially loads the slide ring is supported. It is therefore not necessary to provide a separate component as a cover which would have to be produced and mounted in the mechanical seal as an additional part.

In an advantageous embodiment, the bottom of the housing and/or the ring segment of the sleeve can be provided with structures and/or geometries that are rotation-independent or rotation-dependent. A ventilation of the annular gap can be obtained thereby. Moreover, escape of the coolant/lubricant from the collecting space is thereby made more difficult. The structures or geometries provide in this case that the medium is returned in the direction of the collecting space.

Other features of the invention can be taken from the further claims, the description, and the drawings.

BRIEF DESCRIPTION OF THE DRAWINGS

The invention will be explained in more detail with the aid of some embodiments shown in the drawings.

FIG. 4 shows in axial section a water pump in which a shaft seal according to the invention is used.

DESCRIPTION OF PREFERRED EMBODIMENTS

The shaft seals described in the following are used in particular in water pumps of automobiles. In FIG. 4, such a water pump is shown in an exemplary embodiment; it has a housing 1 in which a pump shaft 2 is supported in a known manner so as to be rotatable. A pump wheel 3 is supported on the end of the pump shaft 2 projecting from the housing 1. The pump shaft 2 is sealed by a shaft seal 4 which is installed in the housing 1. The shaft seal 4 is a mechanical seal. With the aid of FIGS. 1 to 3, different embodiments of such a mechanical seal will be described in more detail; these mechanical seals are embodied such that dry running of the sliding pair is prevented.

Figure 1:
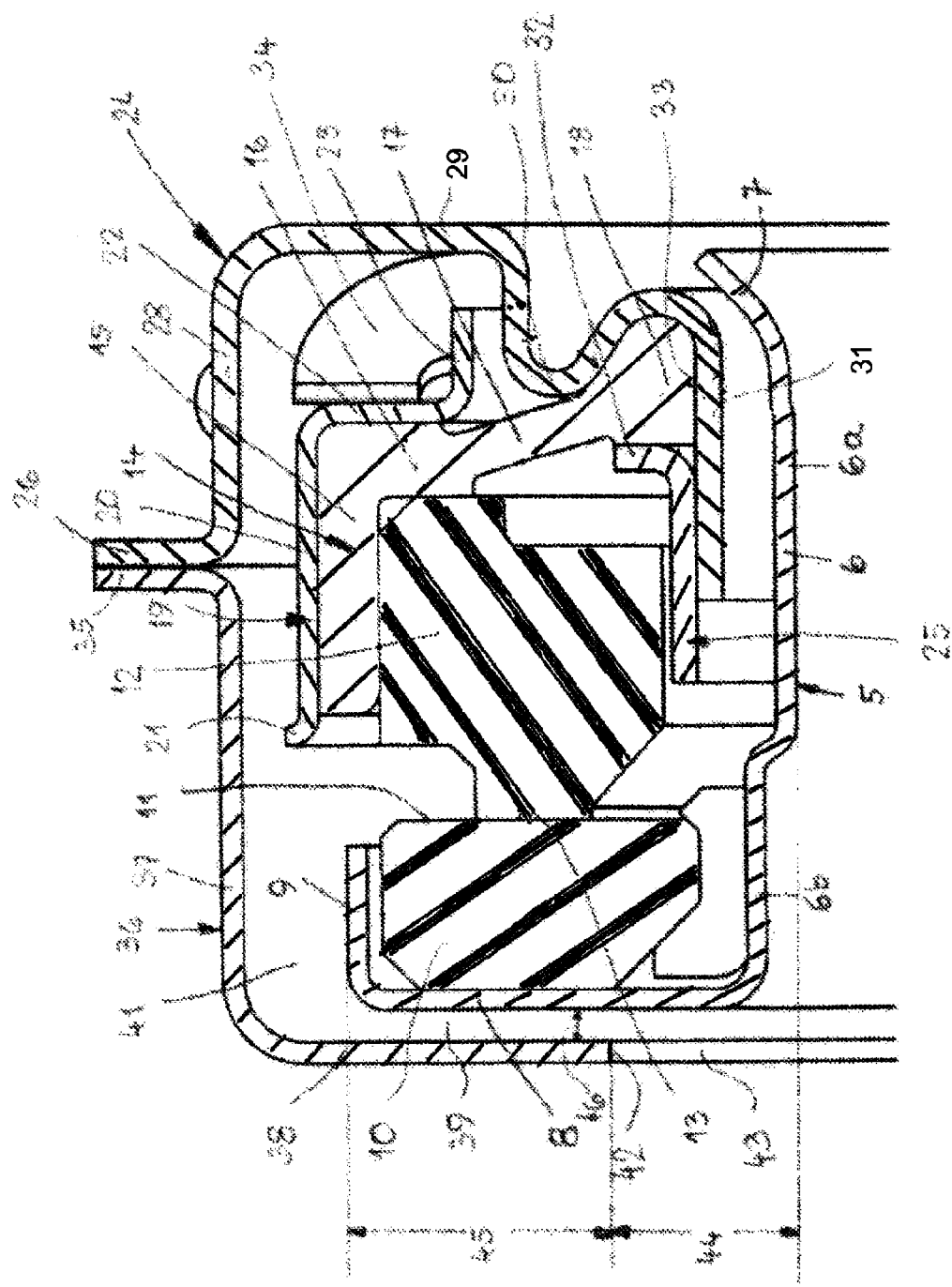
FIG. 1 shows in axial section one half of a shaft seal according to the invention.

The mechanical seal according to FIG. 1 has a sleeve 5 with which the mechanical seal is seated on the pump shaft 2. The sleeve 5 has a wall 6 which is comprised across its axial length of two wall segments 6a and 6b that are radially displaced relative to each other. With the wall segment 6a the sleeve 5 is seated fixedly and with press fit on the pump shaft 2. The other wall segment 6b has a greater internal diameter and a greater external diameter than the wall segment 6a. So that the mechanical seal can be pushed reliably onto the pump shaft 2, the leading end 7 of the wall 6 is funnel-shaped in the pushing direction.

At the other end the wall 6 passes into a radial disc-shaped ring segment 8 whose external cylindrical wall or edge 9 is angled at a right angle. The cylindrical edge 9 and the cylindrical wall segment 6b surround at a radial distance a counter ring 10 that is resting areally against the inner side of the ring segment 8. The opposite side of the counter ring 10 forms a radially extending sealing surface 11 on which a slide ring 12 also having a radially extending sealing surface 13 is resting sealingly. The slide ring 12 contacts with its sealing surface 13 in sealing engagement under an axial force the sealing surface 11 of the counter ring 10. The slide ring 12 is fastened to the inner side of a holding part 14 which is comprised advantageously of elastic material. The holding part 14 has an external cylindrical wall 15 with an inner wall on which the slide ring 12 is resting areally. The wall 15 passes into a radial inwardly directed bottom segment 16 which is connected with a bellows segment 17 to h a ring segment 18. The bellows segment 17 has a wall thickness that is smaller than that of the wall 15, of the bottom segment 16 and of the ring segment 18.

The wall 15 of the holding part 14 is resting against the inner side of a cylindrical wall 20 of a socket-shaped intermediate element 19. It is open in the direction of the ring segment 8 of the sleeve 5. The free end of 21 of the wall 20 is embodied so as to widen conically. The wall 20 adjoins a ring-shaped, radially extending bottom 22 wherein at its inner side the bottom segment 16 of the holding part 14 is resting. The bottom 22 passes into a cylindrical wall 23 approximately at the level of the transition of the bottom segment 16 into the bellows segment 17; the cylindrical wall 23 has a diameter that is smaller than that of the external wall 20 of the intermediate element 19. The bottom segment 16 of the holding part 14 is held between the slide ring 12 and the bottom 22 of the intermediate element 19.

The ring segment 18 is clamped between a housing 24 and a clamping sleeve 25. The clamping sleeve 25 is positioned coaxially to the intermediate element 19 and is fixedly connected to h the housing 24.

The housing 24 is embodied essentially cup-shaped and has an outwardly projecting radial flange 26 that is resting in the installed position (FIG. 4) against a stop surface 27 of the pump housing 1. The outwardly projecting radial flange 26 is provided on the free edge of a cylindrical wall 28 which surrounds the intermediate element 19 at a radial distance. The wall 28 passes with continuous curvature into a radially extending bottom 29 which connects the wall 28 with a clamping segment 30. Viewed in axial section, it is curved to have approximately a U-shaped configuration and is pointing toward the slide ring 12. The clamping segment 30 passes with continuous curvature into an internal cylindrical wall 31 which surrounds the wall 6 of the sleeve 5 at a radial distance. On the wall 31 the clamping sleeve 25 is fixedly secured.

The transition of the clamping segment 30 into the wall 31 is located at the level of the conically widening end 7 of the sleeve 5. The clamping sleeve 25 is provided at the end that is facing the clamping segment 30 of the housing 24 with a radial outwardly extending clamping flange 32. The ring segment 18 of the holding part 14 is clamped between the clamping flange 32 of the clamping sleeve 25 and the clamping segment 30 of the housing 24 in axial direction. The ring segment 18 and the clamping segment 30 are so formed that they are resting flat on each other. Moreover, the ring segment 18 is resting with a radial inner cylinder surface 33 on the exterior side of the wall 31 of the housing 24. The clamping flange 32 has an axial distance relative to the slide ring 12. Also, the cylindrical wall of the clamping sleeve 25 has also a radial distance relative to the slide ring 12.

On the bottom 22 of the intermediate element 19 a spring element 34 is arranged which is supported on the inner side of the bottom 29 of the housing 24 and is resting on the bottom 22 of the intermediate element 19 under axial pretension. Thereby the slide ring 12 is pressed with its sealing surface 13 firmly against the sealing surface 11 of the counter ring 10.

A radial flange 35 of a further housing 36 is attached to the radial flange 26 of the housing 24. It has a cylindrical wall 37 which connects the radial flange 35 with a radial inwardly extending bottom 38. It is positioned opposite the ring segment 8 of the sleeve 5 at an axial distance. The bottom 38 ends at a radial distance from the wall segment 6b of the sleeve 5. The bottom 38 overlaps the ring segment 8 across more than the half the radial width of the ring segment 8. The bottom segment 38 and the ring segment 8 delimit axially an annular gap 39 which has a great radial length as a result of the described overlap between bottom 38 and ring segment 8.

Via the annular gap 39 the interior 40 of the pump (FIG. 4) that is receiving the coolant/lubricant is connected to a collecting space 41 of the shaft seal 4. When the pump is filled with medium, the medium is also contained in the collecting space 41 of the shaft seal 4. The medium contained in the collecting space 41 does not reach the pump shaft 2 in the area of the shaft seal because the sealing gap is closed between the counter ring 10 and the slide ring 12. The collecting space 41 is automatically filled via the annular gap 39 when filling the pump with coolant/lubricant. The medium contained in the collecting space 41 makes sure that the shaft seal 4 can be operated for a sufficiently long period of time even when the pump no longer contains coolant/lubricant. The medium contained in the collecting space 41 makes sure that the counter ring 10 and the slide ring 12 will not run dry when the pump contains no medium anymore. Thereby it is also possible to manufacture the counter ring 10 and the slide ring 12 of materials which would wear very quickly without the coolant/lubricant contained in the collecting space 41.

Because the annular gap 39 extends about more than half the radial width of the counter ring 10, it is achieved that the medium in the collecting space 41 does not escape quickly through the annular gap but is retained for a longer period of time in the collecting space 41. The fact that the edge 42 of the central opening 43 of the bottom 38 has only a minimal radial distance relative to the wall segment 6b or the wall segment 6a also contributes to the extended retention of the coolant/lubricant. The opening edge 42 is so designed that its radial distance 44 from the wall segment 6a and thus from the pump shaft is smaller than the radial distance 45 from the edge 9 of the sleeve 5. The ratio of the distance 45 to the distance 44 is advantageously in a range of from about 1.5:1 to about 3:1. Thereby it is ensured that also for an extended use of the shaft seal 4 enough medium is present for cooling/lubricating the counter ring 10 and the slide ring 12, even when the pump contains no longer any medium. As a result of the relatively long annular gap 39, measured in radial direction, it is also ensured that the medium escapes only very slowly from the collecting space 41 to the exterior. Moreover, the annular gap has only minimal axial height 46 of, for example, only about 0.5 mm to 5 mm, so that in connection with the large radial width of the annular gap 39 a sufficiently long operating period of the shaft seal 4 is ensured for the situation where the pump contains no coolant/lubricant anymore.

The bottom 38 of the housing 36 can comprise in an advantageous manner on its inner side facing the ring segment 8 a structure that can function or operate rotation-independent or rotation-dependent. Such a structure (not shown) can be produced, for example, by laser treatment, grinding and the like. Such a structure functions such that the coolant/lubricant in the annular gap 39 is returned in the direction of the collecting space 41 in the use of the mechanical seal. Thereby it is made sure that in the collecting space 41 there is always enough medium so that the shaft seal 4 can be operated for a longer period of time even when the pump itself contains no longer any coolant/lubricant.

Instead of providing the structure on the inner side of the bottom 38, the bottom 38 can be designed to have a geometry that operates either rotation-independent or rotation-dependent. This geometry of the bottom 38 extends advantageously across the whole radial width of the bottom 38. When this geometry is, for example, a wave form, the waves extend about the circumference of the bottom 38. This geometry is also designed such that coolant/lubricant is conveyed by the geometry in the longitudinal gap 39 back in the direction toward the collecting space 41.

In a further embodiment (not shown) the structure or geometry that is rotation-independent or rotation-dependent can be provided on the ring segment 8 of the sleeve 5. The structure is provided in this case on the side of the ring segment 8 that is facing the bottom 38. The geometry, for example, a wave form, is provided only on the exterior side of the ring segment 8 and is formed in this case by a suitable embossment of the exterior of the ring segment 8. In other respects, the structure and the geometry of the ring segment 8 can be embodied in the same way as those of the bottom 38. Also, the structures and geometries of the ring segment 8 ensure that the medium that passes from the collecting space 41 into the annular gap 39 is returned into the collecting space 41 in use of the mechanical seal.

Finally, it is possible to provide the aforementioned structures and geometries on the bottom 38 as well as on the ring segment 8.

Figure 2:
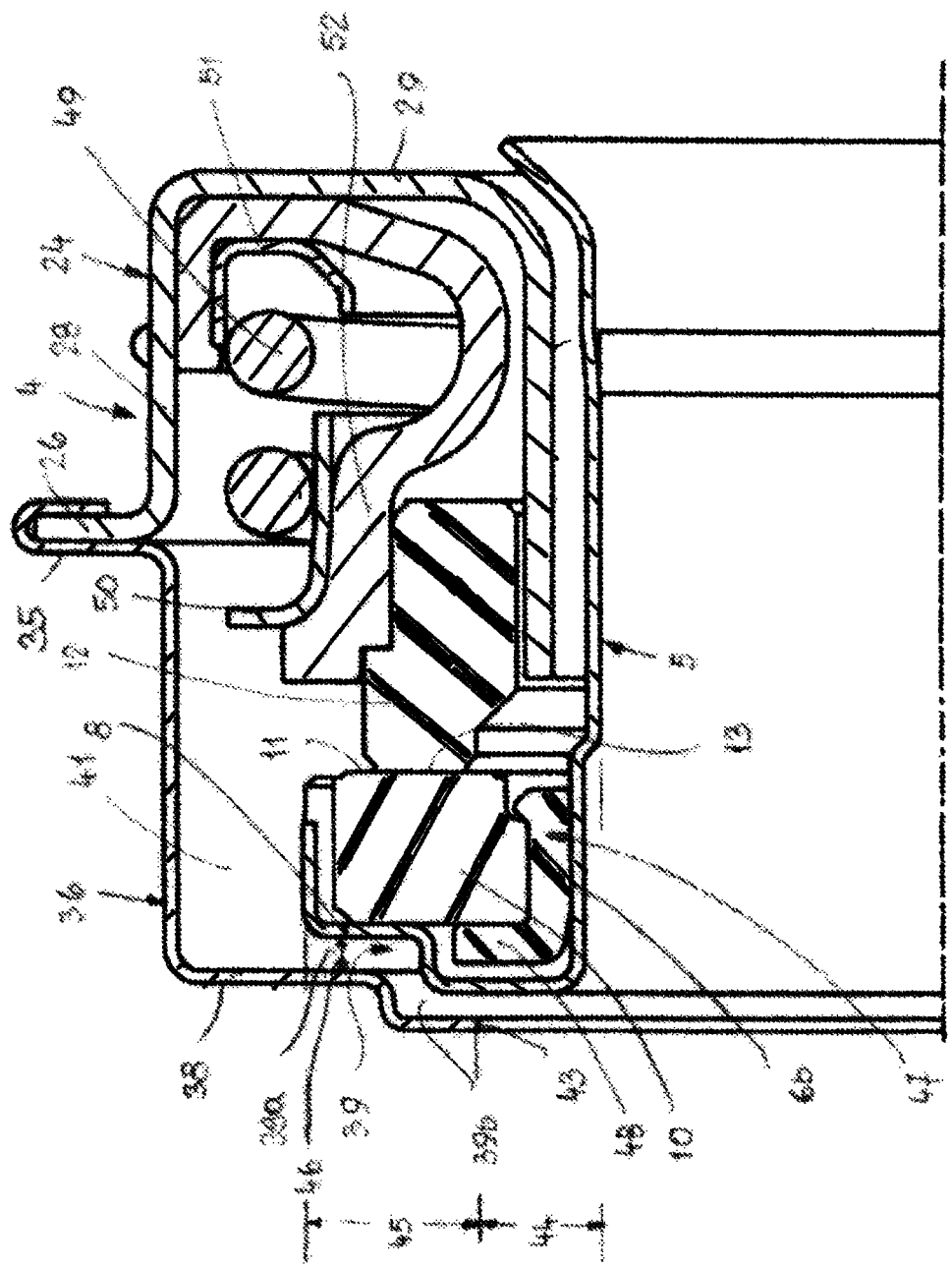
FIG. 2 shows a further embodiment of a shaft seal according to the invention in an illustration according to FIG. 1.

In the embodiment according to FIG. 2, the annular gap 39 is so embodied that the coolant/lubricant contained in the collecting space 41 of the shaft seal 4 is reliably returned so that a premature escape of the medium is avoided.

The annular gap 39 is comprised of two gap segments 39a, 39b that are axially displaced relative to each other. The radial inner annular gap segment 39b is moved outwardly in axial direction of the shaft seal 5 relative to the annular gap segment 39a. In order to provide this form of the annular gap 39, the bottom 38 of the housing 36 as well as the ring segment 8 of the sleeve 5 are shaped appropriately. The area of the bottom 38 that is surrounding the opening 43 is moved in axial direction outwardly. The ring segment 8 has accordingly an outwardly deformed segment in axial direction which passes in an arc shape into the wall segment 6b of the sleeve 5. As in the preceding embodiment, the annular gap 39 has advantageously the same height 46 across its radial width.

The counter ring 10 is connected, as in the preceding embodiment, fixedly with the sleeve 5. This anti-rotation connection is embodied in a manner well-known in the art and is not described therefore in more detail. The counter ring 10 is seated, as in the embodiment of FIG. 1, by means of holding sleeve 47 made of elastomer material on the wall segment 6b of the sleeve 5. The holding sleeve 47 is embodied, as is known in the art, in a sleeve-shaped configuration and is provided at its end facing the bottom 38 of the housing 36 with a radial outwardly oriented flange 48 in which the counter ring 10 is resting across a portion of its radial width. Moreover, with its radial external area the counter ring 10 is resting on the inner side of the ring segment 8 of the sleeve 5.

The slide ring 12 is subjected to the force of a compression spring 49 which is supported with its ends on a spring plate 50, 51, respectively. Both spring plates 50, 51 are supported, in turn, on a bellows element 52 which is connected at an end with the slide ring 12 and is supported at the other end on the inner side of the wall 28 and of the bottom 29 of the housing 24. The spring plate 50 is resting under the force of the compression spring 49 on the bellows element 52. The bellows element 52 surrounds the spring plate 51 in a way known in the art. The compression spring 49 exerts via the bellows element 52 an axial force on the slide ring 12 which is thereby pressed with its sealing surface 13 against the sealing surface 11 of the counter ring 10.

In contrast to the embodiment of FIG. 1, the radial flange 35 of the housing 36 engages about the radial flange 25 of the housing 24.

The ratio of the distances 45 to 44 is in the range of from about 1.5:1 to about 3:1. Thereby it is ensured again that the shaft seal 4 can be used for a sufficiently long period of time even if the pump contains no coolant anymore. On account of this distance ratio, a sufficient quantity of coolant 1 lubricant medium remains in the collecting space 41 so that the counter ring 10 and the slide ring 12 can be cooled/lubricated long enough. Also, the stepped course of the annular gap 39 contributes to the effect that for a longer period of use of the shaft seal 4 the medium contained in the collecting space 41 will only slowly escape to the exterior if the pump contains no medium anymore. The stepped bottom 38 and the stepped ring segment 8 provide an extension of the flow path of the medium from the collecting space 41 while the shaft seal 4 or the housing 36 have still the same radial width.

In the embodiment according to FIG. 2, the bottom 38 is axially displaced in outward direction; it is also possible that the bottom 38 is axially displaced in inward direction. Accordingly, the ring segment 8 of the sleeve 5 is also displaced axially in inward direction. In this way, a long flow path can also be provided for the coolant/lubricant medium.

Figure 3:
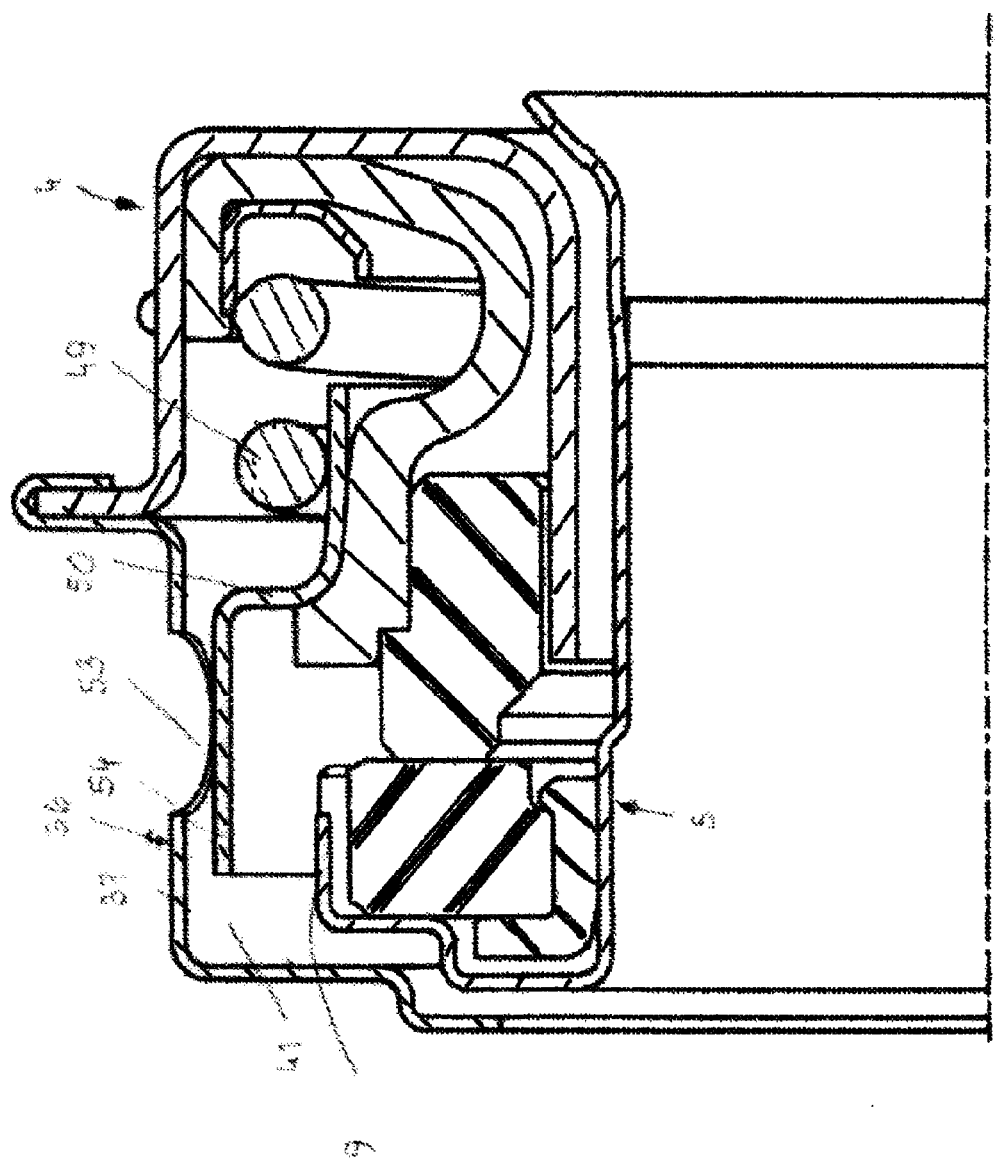
FIG. 3 shows yet another embodiment of a shaft seal according to the invention in an illustration according to FIG. 1.
Figure 3:
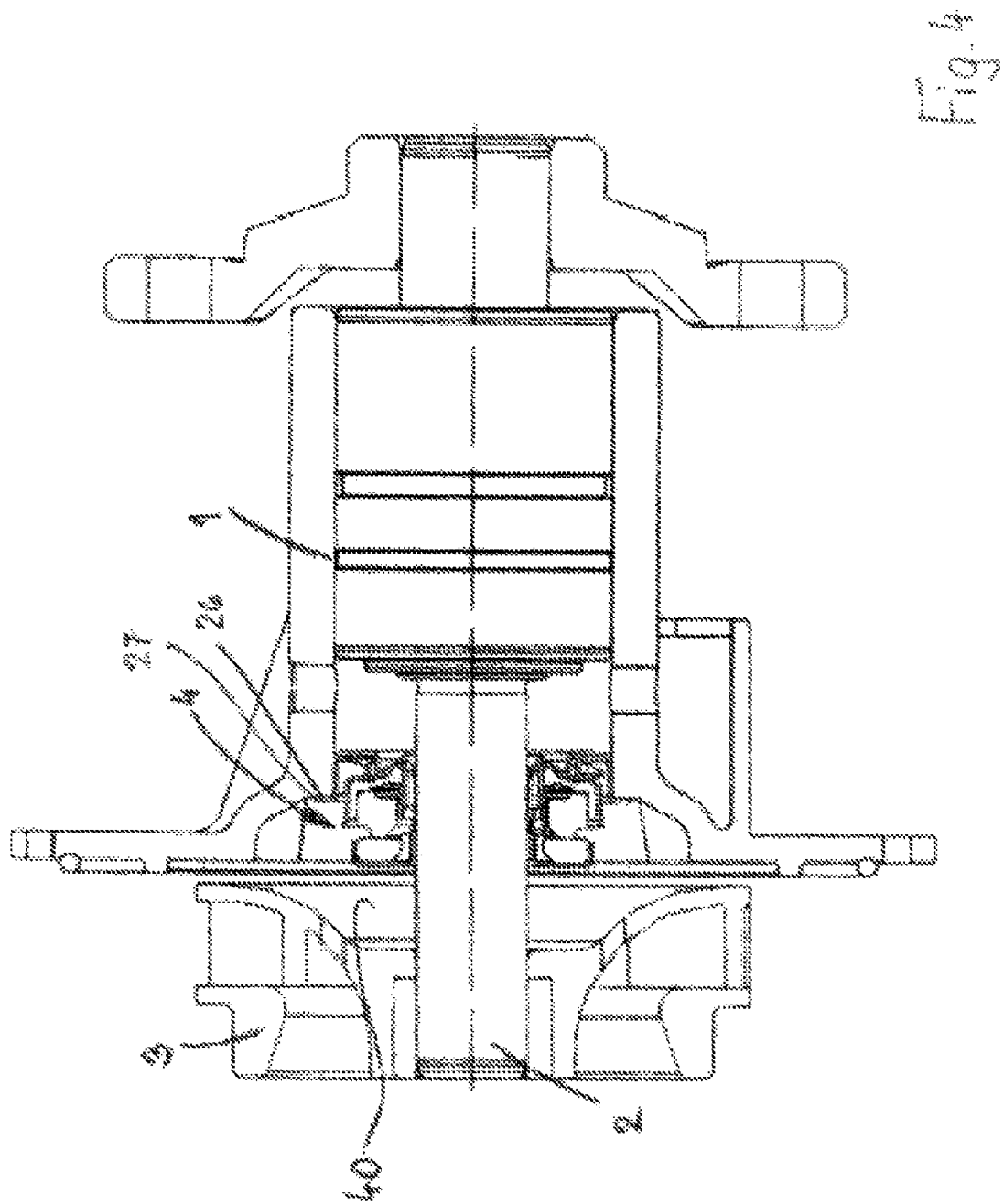

The embodiment according to FIG. 3 is essentially embodied in the same way as the embodiment of FIG. 2. The difference is only that in the wall 37 of the housing 36 at least one venting hole 53 is provided. This opening 53 is mostly covered by a cover 54 so that the coolant/lubricant contained in the collecting space 41 cannot escape unhindered through the venting hole 53 to the exterior. The cover 54 can be an independent component. Nevertheless, the cover 54 is preferably an extension of the spring plate 50 on which one end of the compression spring 49 is supported in axial direction. A very simply embodiment of the shaft seal 4 and in particular also a very easy assembly are thereby provided. This extension 54 of the spring plate 50 extends up to and into the area of the edge 9 of the sleeve 5. The cover 54 surrounds the edge 9 at a radial distance.

The venting hole 53 is covered by the cover 54 in such a way that the free opening cross section is only so large that venting of the collecting space 41 is ensured but the medium contained in the collecting space can however escape only to a minimal extent through the venting hole 53 to the exterior.

In the embodiments according to FIGS. 2 and 3, the structures or geometries described with the aid of FIG. 1 can be provided also.

In all embodiments, the structures or geometries that are rotation-independent or rotation-dependent also serve for venting purposes.

The specification incorporates by reference the entire disclosure of German priority document 10 2011 122 477.0 having a filing date of Dec. 21, 2011.

While specific embodiments of the invention have been shown and described in detail to illustrate the inventive principles, it will be understood that the invention may be embodied otherwise without departing from such principles.

What is claimed is:

1. A mechanical seal comprising:
a housing comprising a first housing part and a second housing part connected to each other by radially outwardly extending flanges, the housing enclosing a collecting space for a coolant/lubricant medium, the housing comprising a cylindrical housing wall having a first axial end and a second axial end and further comprising a first radial bottom connected to the first axial end of the cylindrical housing wall and a second radial bottom connected to the second axial end of the cylindrical housing wall, wherein the collecting space is delimited in radial outward direction by the cylindrical housing wall;
a sleeve comprising a bottom in the form of a radial ring segment, wherein the sleeve is arranged in the housing such that the radial ring segment is positioned at an axial spacing adjacent to the first radial bottom and is positioned remote from the second radial bottom;
wherein the sleeve further comprises an internal cylindrical wall and an external cylindrical wall connected to the radial ring segment of the sleeve, respectively, and extending from the radial ring segment in a direction toward the second radial bottom;
a counter ring disposed in the sleeve and fixedly connected to the sleeve;
a slide ring disposed in the housing and interacting with the counter ring;
the housing, viewed in the radial direction of the housing, surrounding and enclosing at a radial spacing the sleeve, the counter ring, and the slide ring, and the cylindrical housing wall, viewed in the radial direction of the cylindrical housing wall, overlaps the external cylindrical wall of the sleeve;
wherein the first radial bottom and the radial ring segment together delimit at least one radial inlet conduit communicating with the collecting space;
wherein the collecting space is located, viewed in the radial outward direction, radially outwardly of the slide ring and of the counter ring and forms a reservoir storing lubricant/cooling medium to provide the slide ring and the counter ring with lubrication and cooling action to keep the mechanical seal operative when the pump in which the mechanical seal is installed has run dry and contains no lubricant/coolant medium anymore;
wherein the first radial bottom of the housing has a central opening, wherein the external cylindrical wall of the sleeve is positioned at a first radial distance relative to an edge of the central opening and wherein the internal cylindrical wall of the sleeve is positioned at a second radial distance relative to the edge of the central opening, wherein a ratio of the first radial distance to the second radial distance is in a range from about 1.5:1 up to about 3:1 providing a large radial length of the radial inlet conduit.

2. The mechanical seal according to claim 1, wherein the radial inlet conduit is an annular gap.

3. The mechanical seal according to claim 1, wherein the radial inlet conduit has a radial length and extends straight across the radial length.

4. The mechanical seal according to claim 1, wherein the radial inlet conduit has a first segment and a second segment and the first and second segments are displaced in axial direction relative to each other.

5. The mechanical seal according to claim 1, wherein the shaft to be sealed passes through the central opening.

6. The mechanical seal according to claim 1, wherein the counter ring is received between the external cylindrical wall and the radial ring segment.

7. The mechanical seal according to claim 1, wherein the collecting space is sealed relative to the internal cylindrical wall of the sleeve.

8. The mechanical seal according to claim 1, wherein the housing has at least one venting hole opening into the collecting space.

9. The mechanical seal according to claim 8, wherein the at least one venting hole is partially closed by at least one cover.

10. The mechanical seal according to claim 9, further comprising a compression spring that axially loads the slide ring and is supported on a spring plate, wherein the cover is an extension of the spring plate.

\* \* \* \* \*